(12) United States Patent
Halvarsson et al.

(10) Patent No.: US 6,473,319 B2
(45) Date of Patent: *Oct. 29, 2002

(54) PLANT FOR TRANSMITTING ELECTRIC POWER AND A METHOD FOR CHANGING THE DIRECTION OF POWER TRANSMISSION IN SUCH A PLANT

(75) Inventors: Bruno Halvarsson, Ludvika (SE); Lars Hermansson, Västerås (SE)

(73) Assignee: ABB AB, Vasteras (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/445,474
(22) PCT Filed: May 27, 1998
(86) PCT No.: PCT/SE98/00997
§ 371 (c)(1),
(2), (4) Date: Dec. 8, 1999
(87) PCT Pub. No.: WO98/57411
PCT Pub. Date: Dec. 17, 1998

(65) Prior Publication Data
US 2002/0085396 A1 Jul. 4, 2002

(51) Int. Cl.⁷ .................................................. H02J 3/36
(52) U.S. Cl. ........................................................ 363/35
(58) Field of Search ............................. 363/34, 35, 37; 174/17, 18

(56) References Cited
U.S. PATENT DOCUMENTS 4,153,752 A 5/1979 Mackenzie, Jr. et al.
4,250,542 A * 2/1981 Bulakhov et al. .............. 363/35
4,274,990 A * 6/1981 MacKenzie Jr., et al. ............... 260/29.15 B
4,331,733 A * 5/1982 Evans et al. ................. 428/379
5,187,651 A * 2/1993 Ekstrom ....................... 363/35
5,420,495 A * 5/1995 Hingorani .................... 323/218
5,461,300 A * 10/1995 Kappenman ................. 323/215

FOREIGN PATENT DOCUMENTS
DE 4439012 5/1996

OTHER PUBLICATIONS

Power Transmission by Direct Current, Uhlmann, New York, 1975, No Month.

Direct Current Transmission, vol. 1, Kimbark, 1971, No Month.

\* cited by examiner

Primary Examiner—Edward H. Tso
Assistant Examiner—Gary L. Laxton
(74) Attorney, Agent, or Firm—Dykema Gossett PLLC

(57) ABSTRACT

A plant for transmitting electric power with a direct voltage network and at least two stations connected thereto with line commutated valves (15, 16) with bidirectionally controlled thyristors (BCT) with ability to conduct current in both directions therethrough as rectifying semiconductor components, comprises at least one cable (12) with an insulating mantle with a polymer base surrounding the conductor thereof for forming the direct voltage network interconnecting the stations. The plant has also a unit (21) adapted to control the thyristors of the valves for changing the power feeding direction between the stations through changing the current direction in said cable.

4 Claims, 1 Drawing Sheet

PLANT FOR TRANSMITTING ELECTRIC POWER AND A METHOD FOR CHANGING THE DIRECTION OF POWER TRANSMISSION IN SUCH A PLANT

FIELD OF THE INVENTION AND PRIOR ART

The present invention relates to a plant for transmitting electric power comprising a direct voltage network for High Voltage Direct Current (HVDC) and at least two stations connected thereto with line commutated valves with thyristors as rectifying semiconductor components for transmitting electric power between the direct voltage network and alternating voltage networks connected to the stations, in which it comprises at least a cable having an insulating mantle with a polymer base surrounding the conductor thereof for forming the direct voltage network interconnecting the stations, as well as a method for changing the power feeding direction of a plant of this type according to the preamble of the appended independent method claim.

An advantage of the use of such a cable for power transmission between stations of such a plant is that it is considerably less costly than cables used before with an inner conductor surrounded by a thick insulating mantle formed by paper soak in oil. It has neither the serious disadvantage of a comparatively large disturbing influence upon nature and living creatures as have air lines where they are arranged. However, cables of the type defined in the introduction, which are generally called the PEX-type by the man skilled in the art, are associated with the disadvantage of the known plants of the type defined in the introduction, that they do not allow that the polarity of the cable is changed rapidly, but the cable has to first be discharged, which is a very time consuming procedure. This is a great disadvantage of these plants already known, since the power feeding direction on the direct voltage network between the stations thereof is changed by changing the voltage polarity of the valves and by that of the entire cable. It is necessary to proceed in this way, since the valves can only conduct current in one predetermined direction therethrough. During the time of discharging of the cable no power may be transmitted between the stations, wouldn't the plant have been provided with an additional extra cable to be switched in. However, it will be unacceptably expensive to have such double cables and the main idea of using this type of cables will then get lost. But there is in many cases a requirement of a so-called emergency power regulation, which means that it should be possible to change the power feeding direction very rapidly for stabilising an alternating voltage network connected to any station belonging to the plant.

The construction of such a plant already known is schematically illustrated in FIG. 1, and this plant has a direct voltage network 1 with a cable 2 schematically indicated having an insulating mantle with a polymer base surrounding the conductor thereof. The plant has two stations 3, 4 which are illustrated by the symbol of a current valve 5, 6 each, which they have and which connect the respective station with an alternating voltage network 7, 8 through a transformer 9, 10 for feeding electric power between the respective alternating voltage network and the direct voltage network. Since the rectifying thyristors arranged in the valves 5 and 6 only are able to conduct current in one direction therethrough, each valve may also only conduct current in one direction between the respective alternating voltage network and the direct voltage network. More exactly, the current direction through the direct voltage cable 2 will always be from the station 3 to the station 4, and the power feeding direction can only be changed by changing the polarity at the stations with a maintained current direction. This requires as mentioned above a long discharging time, during which no power may be transmitted between the stations.

SUMMARY OF THE INVENTION

The object of the present invention is to provide a plant of the type defined in the introduction, which makes the so-called emergency power regulation mentioned above possible without any requirement of costly arrangements in the form of extra cables or the like, as well as a method for rapidly changing the power feeding direction according to the type defined in the introduction.

This object is according to the invention obtained by the fact that in a plant defined in the introduction the thyristors of the valves of the station are bidirectionally controlled thyristors (BCT) with ability to conduct current in both directions therethrough, and the plant has a unit adapted to control the thyristors of the valves for changing power feeding direction between the stations by changing the current direction in said cable.

By the new approach to arrange so-called BCTs (Bidirectionally Controlled Thyristors) in valves of a plant of this type the less costly cable of PEX-type may be used for direct voltage networks, but the requirements of the customers of a rapid reversing of the power feeding direction as well as high demands on availability may be fulfilled. No time consuming discharging of the cable is namely required before the power feeding direction may be changed, when this change takes place with maintained polarity and is only achieved through reversing the current direction through the cable. The power feeding direction may in a plant of this type frankly be changed by gradually reducing the power fed and by that the current in the cable in a normal way to zero, or close to zero, so that the transmission through the direct voltage network is temporarily stopped, whereupon a changed current direction is ordered through said unit, whereupon the current is gradually increased again in the opposite direction so as to obtain a level corresponding to a desired level of the power supply in the other direction. The power feeding direction has in this way been changed without changing the voltage polarity of the cable.

The arrangement of BCTs in the valves instead of conventional thyristors, which can only conduct current in one direction, does not result in any considerable extra costs, since they may be built in into the valves on the same places as the conventional thyristors would otherwise have, and no increased insulation distances or large modifications of the control equipment of the stations are required. These bidirectionally controlled thyristors are thyristors of the type described in for example DE 44 39 012 A1 and are sometimes also called two-direction thyristors.

The method according to the invention according to the appended independent method claim is directed to the advantageous way just described to take care of a change of the power feeding direction of a plant of this type, and the advantages of this method, which enables a very rapid reversing of the power feeding, appear very clearly from the discussion above.

Further advantages as well as advantageous features of the invention appear from the following description and the other dependent claims.

BRIEF DESCRIPTION OF THE DRAWING

With reference to the appended drawing, below follows a description of a preferred embodiment of the invention cited as an example.

In the drawing.

DETAILED DESCRIPTION OF A PREFERRED EMBODIMENT OF THE INVENTION

Figure 1:
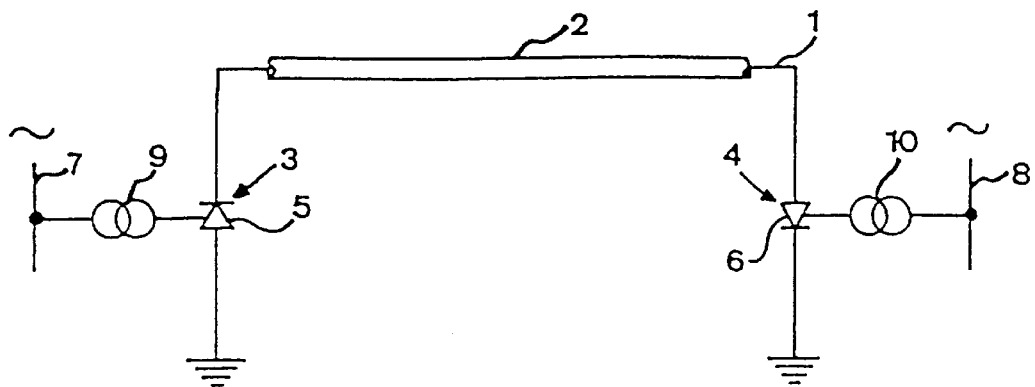
FIG. 1 is a very schematic view of a plant already known for transmitting electric power between two stations through a cable for conducting High Voltage Direct Current (HVDC)
Figure 2:
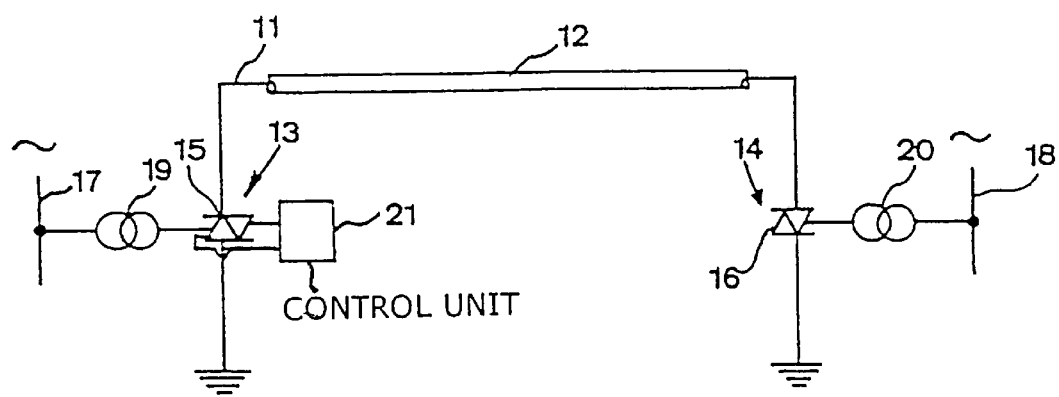
FIG. 2 is a view corresponding to FIG. 1 of a plant according to a preferred embodiment of the invention.

The construction of a plant for transmitting electric power is very schematically illustrated in FIG. 2 and this plant comprises a direct voltage network 11 for High Voltage Direct Current (HVDC=High Voltage Direct Current), which is formed by a cable 12 schematically indicated and having an insulating mantle with a polymer base surrounding the conductor thereof, more specially an extruded cable of PEX-type, i.e. with a mantle of cross-linked polyeten. The direct voltage network interconnects two stations 13, 14, which are indicated through valves 15, 16 and to each of which an alternating voltage network 17, 18 is connected through a transformer 19, 20.

The direct voltage network has typically a potential difference of 10–500 kV with respect to earth. The valves are in a conventional way formed by for example so called 12-pulse bridges, in which a number of rectifying semiconductor components in the form of thyristors are connected in series, since they in turn-off state each can normally only hold 1–10 kV and the considerably higher voltage across the valves has to be distributed among the different thyristors.

The thyristors are here formed by so-called BCTs (Bidirectionally Controlled Thyristor), i.e. bidirectionally controlled thyristors, which are formed by two halves belonging to the same disc connected in antiparallel with each other, so that the thyristors of the valve may through a unit 21 indicated for the valve 15 be controlled for changing the power feeding direction between the stations through changing the current direction through the valve and by that through the cable 12.

Thus, the power feeding direction between the stations may in the plant according to the invention be changed in the following way. We assume that the cable 12 has a positive polarity, which means that the power feeding direction therethrough corresponds to the current direction. When power is fed from the station 13 to the station 14, the current is also led in this direction. Is it now desired to reverse the power feeding direction, the electric current fed between the stations and by that the power fed in the cable 12 is first gradually reduced to zero, or close to zero, and the power transmission through the direct voltage network is temporarily stopped, whereupon a changed current direction in the cable 12 is ordered through the unit 21 by controlling the thyristors of the two valves so as to change the half turned on. The power transmission of the direct voltage network is then started again and the current through the cable, now in the direction from the second station 14 to the first 13, is gradually increased until the desired level of the power fed through the cable in the opposite direction to earlier is obtained. Thus, the polarity of the cable remains the same all the time, which means that any time consuming discharging of the cable, during which no power may be transmitted therethrough, is avoided.

The invention is of course not in any way restricted to the preferred embodiment of the invention described above, but many possibilities to modifications thereof would be apparent to a man skilled in the art without departing from the basic idea of the invention.

The number of stations of the plant could for example be more than two, and it would also be possible that the direct voltage network is bipolar, and this is dependent on whether the desire of transmitted power may be managed through only one cable, or if two are needed therefor.

What is claimed is:

1. A plant for transmitting electric power, in a first power feeding direction and a second power feeding direction opposite thereto, comprising a direct voltage network for High Voltage Direct Current (HVDC), at least two stations connected thereto and an alternating voltage network connected to each station, line commutated valves for transmitting the electric power between the direct voltage network and the alternating voltage network connected to each respective station, at least one cable operable in at least one of at a first polarity and a second polarity when carrying power in the first power feeding direction, and operable in at least one of the first polarity and the second polarity when carrying power in the second power feeding direction including a conductor, an insulating mantle with a polymer base surrounding the conductor forming the direct voltage network interconnecting stations, and wherein the line commutated valves comprise bidirectionally controlled thyristors (BCT) for conducting current therethrough in a first current carrying direction and a second current carrying direction opposite thereto, and a control unit for controlling the thyristors for changing the power feeding direction between the stations by immediately changing direction in said cable without the necessity for changing the polarity of the cable.

2. A plant according to claim 1, wherein said cable comprises an extruded cable.

3. A plant according to claim 1 wherein the direct voltage network comprises a unipolar network including only one pole line between the stations formed by said cable at a high voltage potential level.

4. A method for changing power feeding direction of a plant for transmitting electric power, which comprises a direct voltage network for High Voltage Direct Current (HVDC) and at least two stations connected thereto with line commutated valves with bidirectionally controlled thyristors (BCT) as rectifying semiconductor components for transmitting electric power between the direct voltage network and alternating voltage networks connected to the stations, in which the plant has at least one cable with an insulating mantle with a polymer base surrounding the conductor thereof for forming the direct voltage network interconnecting the stations, comprising the steps of reducing the electric power fed between the stations by reducing the current in said cable gradually to zero or close to zero from a first direction, temporarily stopping power transmission through the direct voltage network controlling the thyristors to change current direction in said cable and increasing the power transmission of the direct voltage network by gradually increasing the current through the cable in a second direction opposite to the first direction until a desired level is obtained for power fed through the cable.

* * * * *